March 19, 1957  A. H. LINES  2,786,128
APPARATUS FOR SPARK MACHINING
Filed March 3, 1955
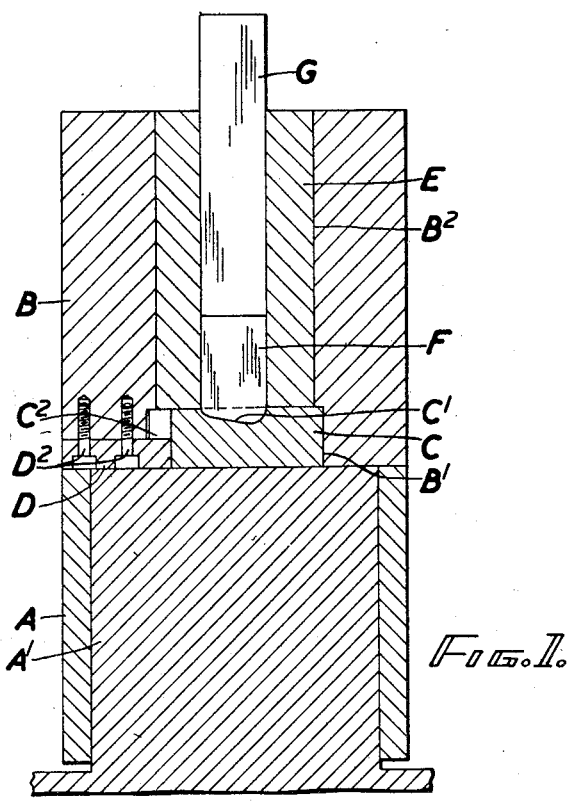
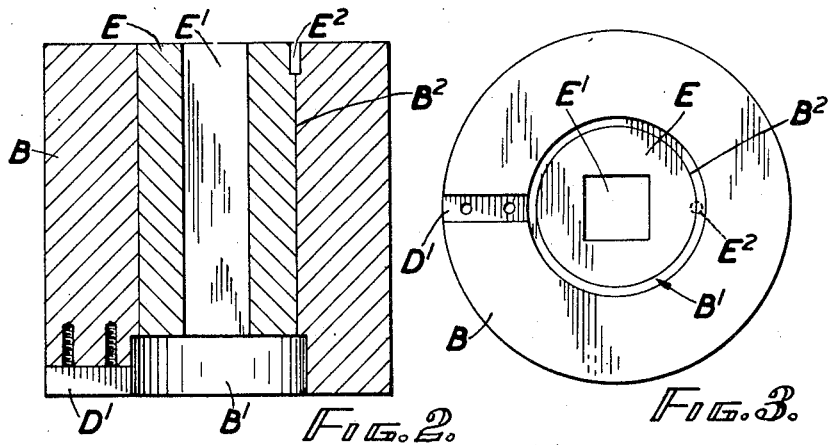
INVENTOR
ANTHONY H. LINES
BY Watson, Cole, Grindle
, Watson
ATTORNEYS

United States Patent Office 2,786,128
Patented Mar. 19, 1957

2,786,128
APPARATUS FOR SPARK MACHINING

Anthony Hillesden Lines, Pinner, England, assignor to D. Napier & Son Limited, London, England, a British company Application March 3, 1955, Serial No. 491,923

Claims priority, application Great Britain March 11, 1954

1 Claim. (Cl. 219—145)

This invention relates to apparatus for spark machining, that is to say, apparatus for removing metal from a metallic part, comprising an electrode (hereinafter called the tool electrode) arranged in an electric circuit which includes a condenser and a source of electric potential and into which the part to be "machined" can also be connected, the arrangement being such that short periods during which there is no electro conducting path between the tool electrode and the part being machined and during which the condenser therefore becomes charged, alternate with the formation of an electro conducting path between the tool electrode and the part being machined, over which path the electro potential previously stored is discharged, such discharge causing a small particle of metal to be removed from the part being machined. Such apparatus, in which the part being machined and the adjacent end of the electrode are immersed in a suitable liquid, for example paraffin, includes means for feeding the tool electrode progressively towards the part being machined, and the arrangement is such that after each discharge the electro conducting path between the tool electrode and the part being machined is broken so that the condenser becomes automatically recharged in readiness for the next discharge, the alternate charging and discharging taking place in rapid succession, for example at the rate of several hundred charges and discharges per second. In one example the forward feed of the tool electrode is controlled by apparatus responsive to the mean electric potential between the tool electrode and the part being machined, in such manner that increases in this mean potential above a predetermined value cause the forward feed to take place or increase in speed and vice versa, the frequency of the discharges between the tool electrode and the part being machined being in this example of the order of 300 per second while the voltage of the source of electrical potential is about 100 volts.

In apparatus of the kind referred to it is usual to make the cross sectional form of the end of the tool electrode which engages the part to be machined conform to the shape of the area over which metal is to be removed and one of the principal applications of spark machining is to the forming of recesses or holes of special cross section in or through parts in cases where ordinary mechanical machining methods would be difficult or impossible, and since during spark machining the end of the tool electrode is eroded as well as the part being machined it is necessary in practice to reshape the end of the tool electrode at frequent intervals, usually after each machining operation.

The tool electrodes in spark machining as at present practiced are usually formed of brass and in a typical example of spark machining using such a brass electrode to machine a hard steel alloy, the volumetric rate at which the steel alloy is removed is about 0.0038 cubic inch per minute while the ratio between the volume of steel alloy and of the brass electrode removed is about 1.310, that is to say the volumetric rate of removal of electrode brass is a little higher than the volumetric rate of removal of the steel alloy.

It is an object of the present invention to provide spark machining apparatus in which the ratio between the volumetric rate at which material is removed from the tool electrode and that at which metal is removed from the part being machined will be more satisfactory and in which an improved speed of removal of metal from the part being machined for given conditions will also preferably be obtained.

In spark machining apparatus according to the present invention the tool electrode is formed of a composite material consisting of a matrix of a metal of good electrical conductivity in which is carried and dispersed in the form of minute particles or granules graphite or other non-metallic substance having appropriate electrical conductivity, at least at the temperature to which it will be subject in use, and a relatively high melting point, that is to say a substantially higher melting point than the matrix metal.

The term "non-metallic substance" is used herein for convenience and is to be interpreted as meaning any substance which is not a metal or a metal alloy and to include metallic carbides or other metal compounds having a metal base.

It is believed that the improved results obtained with the invention over previous practice may be due to the fact that, with a tool electrode made of a composite material of the kind referred to the matrix metal ensures that the electric current is conducted efficiently to the immediate area of the tool electrode at which the electro conducting path to the part being machined at any moment is formed, and each discharge of energy between a point on the tool electrode and the adjacent point on the part being machined tends to remove a small part of any matrix metal at the immediate point of discharge in preference to removing the high temperature non-metallic substance which the matrix metal carries, with the general result that the surface of the tool electrode which lies in close proximity to the part being machined and over which the discharges thus take effect tends to present a series of high points formed by the non-metallic substance projecting very slightly above the surrounding matrix metal so that these high points of the relatively high melting point substance tend to take the main brunt of the discharges in question, which they are able to withstand better than the matrix metal.

One particularly suitable material for the tool electrode of spark machining apparatus according to the invention has been found to be that consisting of a matrix of copper in which graphite is dispersed. In another example silver is used as the matrix metal instead of copper while an example of non-metallic substance which may be used instead of graphite in either of the above examples is boron carbide.

It is understood that in some cases the non-metallic constitutent of the tool electrode might be a mixture of substances.

The electrical conducting properties of the non-metallic material employed in tool electrodes according to the invention need not be good and a substance of the so called semi-conducting type may be used since the matrix metal serves to conduct the potential substantially to the point of discharge and any resistance introduced by the very small particle or particles of such a semi-conducting material at the actual point of discharge will not be great.

Where the tool electrode comprises a matrix of copper carrying graphite dispersed therein one good example from the point of view of providing for quick removal of metal from the part being machined and a good ratio between the rates of removal respectively of metal from the part being machined and material from the tool electrode, consists of a material comprising 65% of copper and 35% of finely divided graphite of the kind commonly called "colloidal" graphite.

Another example, which is slightly less satisfactory than the above in the two respects mentioned but has the advantage that it can be shaped by pressing, is a material consisting of 84% of copper in which is dispersed 16% of colloidal graphite.

It will be apparent that the ability to shape such material by pressing may have great advantages since it will enable the end of a tool electrode to be reshaped when required by a simple pressing operation instead of a grinding operation as at present required. Moreover, such pressing operation would require only a suitably shaped die and a press to enable reshaping to be effected quickly and easily without the use of appreciable skill and if desired by the operator of the spark machining apparatus.

One simple form of device by which such re-shaping can be effected is shown in cross-section in the accompanying drawings, in which Figure 1 is a sectional side elevation of the complete device, Figure 2 is a similar view to Figure 1 of the upper part of the device before assembly, and Figure 3 is an underneath plan view of the part shown in Figure 2.

The device shown in the drawings comprises a tubular base A which can be mounted on a supporting pillar or boss $A^1$ as shown and an upper part comprising a block B rigidly secured to the base A so as to rest on the top of the boss $A^1$ and having an approximately cylindrical vertical bore formed therein. The lower end $B^1$ of this bore is slightly larger in diameter than the upper part $B^2$ as clearly shown in the drawings. Mounted within the lower enlarged end $B^1$ of the bore in question is a die block C having formed in its upper face a recess $C^1$ which is rectangular in plan and of dimensions corresponding to the cross-section of the end of the tool to be shaped, this die block having a keyway or locating slot $C^2$ in one side thereof which is engaged by a locating plate D lying within a slot $D^1$ in the lower end of the part B and secured in such slot by screws $D^2$ as shown. As will be seen die block C rests upon the upper end of a supporting pillar or boss $A^1$.

The smaller diameter part $B^2$ of the bore in the block B has mounted therein a guide member E having a square bore $E^1$ in which the tool to be shaped makes a reasonably close sliding fit, this guide member being located rotationally within the bore in the block B by means of a locating pin indicated at $E^2$ so that a tool passed down its bore is correctly located in the rotational sense in relation to the recess $C^1$ in the die block C.

When the end of a tool according to the invention requires to be re-shaped, it is inserted into the bore $E^1$ as shown at F in Figure 1 so that its lower end engages the recess $C^1$ in the die block C and then has pressure or one or more hammer blows applied to its upper end by a rod like member G so that its lower end is forced into and shaped by the recess $C^1$ in the die block C.

In a typical example of apparatus according to the invention, a tool electrode formed of a material consisting of a copper matrix comprising 84% of the material in which is dispersed colloidal graphite representing 16% of the material, is coupled into an appropriate electric circuit including a source of direct current of approximately 100 volts and a suitable condenser and means for connecting a steel part which is to be machined into the circuit so that when the tool electrode and the part to be machined are out of electrical contact the condenser will be charged and discharge will take place when an electro-conducting path is formed between the part being machined and the tool electrode. The part to be machined is, during machining, supported in a bath of paraffin while the tool electrode is mounted upon a support having associated with it a feeding device arranged to be electrically operated and so connected to apparatus responsive to the mean electrical potential between the tool electrode and the part to be machined that it is caused to feed the tool electrode towards the part to be machined when this mean electrical potential is above a predetermined value.

The free end of the tool electrode is so shaped as to conform to the shape of a recess to be formed by spark machining in the part to be machined, and the arrangement is such that this end of the tool electrode will be maintained by the feeding mechanism in a position in which the required alternate charging of the condenser and discharging across an electro-conducting path formed between the end of the tool electrode and the part being machined will take place.

What I claim as my invention and desire to secure by Letters Patent is:

Spark machining apparatus in which the tool electrode is formed of composite material consisting of a matrix of copper and graphite and comprising approximately 84% of copper and 16% of graphite.

References Cited in the file of this patent
UNITED STATES PATENTS 2,436,205   Deitz et al. _____ Feb. 17, 1948